US011451899B2

(12) United States Patent
Lin et al.

(10) Patent No.: US 11,451,899 B2
(45) Date of Patent: Sep. 20, 2022

(54) BLUETOOTH EARPHONE SYSTEM, AND EARPHONE CASE FOR STORING AND CHARGING BLUETOOTH EARPHONES

(71) Applicant: REALTEK SEMICONDUCTOR CORPORATION, Hsinchu (TW)

(72) Inventors: Hou-Wei Lin, Hsinchu (TW); Ying-Tsung Lin, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 17/363,035

(22) Filed: Jun. 30, 2021

(65) Prior Publication Data
US 2022/0060809 A1 Feb. 24, 2022

(30) Foreign Application Priority Data
Aug. 24, 2020 (TW) .................................. 109128792

(51) Int. Cl.
*H04R 1/10* (2006.01)
*H04W 76/14* (2018.01)

(52) U.S. Cl.
CPC ......... *H04R 1/1041* (2013.01); *H04R 1/1025* (2013.01); *H04W 76/14* (2018.02); *H04R 2420/07* (2013.01)

(58) Field of Classification Search
CPC .... H04R 1/1041; H04R 1/1025; H04W 76/14
See application file for complete search history.

(56) References Cited

U.S. PATENT DOCUMENTS

| | | | | |
|---|---|---|---|---|
| 11,172,101 | B1* | 11/2021 | Boozer | H04N 5/23241 |
| 2017/0094399 | A1* | 3/2017 | Chandramohan | H02J 50/10 |
| 2018/0091887 | A1* | 3/2018 | Minoo | H04R 1/1025 |
| 2021/0409856 | A1* | 12/2021 | Zhu | H04W 4/80 |
| 2022/0039179 | A1* | 2/2022 | Chen | H04W 76/14 |
| 2022/0078541 | A1* | 3/2022 | Zhu | H04W 4/38 |
| 2022/0078864 | A1* | 3/2022 | Yang | H04R 1/1025 |
| 2022/0148608 | A1* | 5/2022 | Wang | H04M 1/6066 |

FOREIGN PATENT DOCUMENTS

| | | |
|---|---|---|
| CN | 109614628 A | 4/2019 |
| CN | 110366062 A | 10/2019 |
| CN | 110602584 A | 12/2019 |

* cited by examiner

*Primary Examiner* — Simon King
(74) *Attorney, Agent, or Firm* — WPAT, PC

(57) ABSTRACT

An earphone case for storing and charging Bluetooth (BT) earphones includes: an earphone container for accommodating a pair of BT earphones; a BT circuit for communicating with the pair of BT earphones through BT communication after the pair of BT earphones is taken out; a microphone for receiving outside sound to generate a microphone signal after the pair of BT earphones is taken out; an audio circuit for generating an audio signal according to the microphone signal and providing the audio signal for the pair of BT earphones through the BT circuit in a predetermined mode; a user interface for generating a control signal according to user control after the pair of BT earphones is taken out, and providing the control signal for the pair of BT earphones through the BT circuit; and a control circuit for controlling the interaction between the earphone case and the pair of BT earphones.

19 Claims, 4 Drawing Sheets

BLUETOOTH EARPHONE SYSTEM, AND EARPHONE CASE FOR STORING AND CHARGING BLUETOOTH EARPHONES

BACKGROUND OF THE INVENTION

1. Field of the Invention

The present disclosure relates to a Bluetooth (BT) system and device, especially to a BT earphone system and an earphone case for storing and charging BT earphones.

2. Description of Related Art

A general Bluetooth (BT) earphone case is simply for storing and charging a BT earphone. A user control interface (e.g., touch control interface) for the control of a BT earphone is usually integrated with the BT earphone, and is often not handy because of its limited size or its discursive control manner (e.g., consecutive clicks). In view of the above, if a BT earphone case can function as a user control interface for the control of a BT earphone, the way to control the BT earphone can be greatly simplified.

SUMMARY OF THE INVENTION

An object of the present disclosure is to provide a Bluetooth (BT) earphone system and an earphone case for storing and charging a pair of BT earphones. The earphone system includes the earphone case which can control the pair of BT earphones through a physical connection in one circumstance and through BT communication in another circumstance.

An embodiment of the BT earphone system of the present disclosure includes a pair of BT earphones and an earphone case for storing and charging the pair of BT earphones. The earphone case includes an earphone container, a rechargeable battery, a charging circuit, a BT circuit, a microphone circuit, an audio circuit, a user interface circuit, and a control circuit. The earphone container is for accommodating the pair of BT earphones, and includes multiple case terminals configured to be coupled with multiple earphone terminals of the pair of BT earphones. The charging circuit is configured to charge the pair of BT earphones with the power of the rechargeable battery when the earphone container accommodates the pair of BT earphones. The BT circuit is configured to be paired with the pair of BT earphones when the earphone container accommodates the pair of BT earphones, and further configured to communicate with the pair of BT earphones through BT communication after the pair of BT earphones is taken out from the earphone container. The microphone circuit is configured to receive outside sound and thereby generate a microphone signal after the pair of BT earphones is taken out from the earphone container. The audio circuit is configured to generate an audio signal according to the microphone signal and then provide the audio signal for the pair of BT earphones through the BT circuit in a predetermined mode. The user interface circuit is configured to provide a user control signal for the pair of BT earphones through the BT circuit in response to user control. The control circuit is configured to control interaction between the earphone case and the pair of BT earphones. The pair of BT earphones is configured to communicate with the earphone case through the multiple earphone terminals when the earphone container accommodates the pair of BT earphones, and to communicate with the earphone case through the BT communication after the pair of BT earphones is taken out from the earphone container.

An embodiment of the earphone case of the present disclosure is for storing and charging a pair of BT earphones, and includes an earphone container, a rechargeable battery, a charging circuit, a BT circuit, a microphone circuit, an audio circuit, a user interface circuit, and a control circuit. The earphone container is for accommodating the pair of BT earphones, and includes multiple case terminals configured to be coupled to the pair of BT earphones. The charging circuit is configured to charge the pair of BT earphones with the power of the rechargeable battery when the earphone container accommodates the pair of BT earphones. The BT circuit is configured to be paired with the pair of BT earphones when the earphone container accommodates the pair of BT earphones, and further configured to communicate with the pair of BT earphones through BT communication after the pair of BT earphones is taken out from the earphone container. The microphone circuit is configured to receive outside sound and thereby generate a microphone signal after the pair of BT earphones is taken out from the earphone container. The audio circuit is configured to generate an audio signal according to the microphone signal and then provide the audio signal for the pair of BT earphones through the BT circuit in a predetermined mode. The user interface circuit is configured to provide a user control signal for the pair of BT earphones through the BT circuit in response to user control after the pair of BT earphones is taken out from the earphone container. The control circuit is configured to control interaction between the earphone case and the pair of BT earphones.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure describes a Bluetooth (BT) earphone system and an earphone case for storing and charging a pair of BT earphones. The system includes the earphone case which can control the pair of BT earphones through a physical connection in one circumstance and through BT communication in another circumstance; furthermore, the earphone case can receive outside sound to generate audio signals for the pair of BT earphones. In comparison with the prior art, the present system and earphone case not only simplify the way to control a pair of BT earphones, but also increase/improve the applicability of the system.

Figure 1:
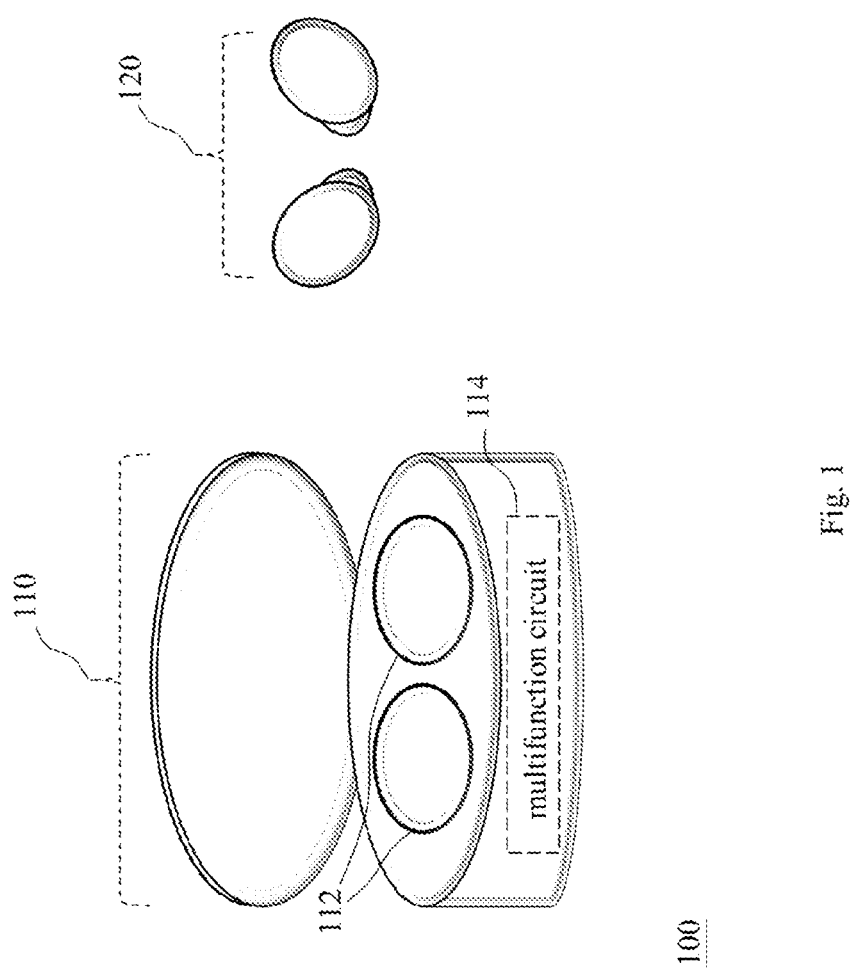
FIG. 1 shows an embodiment of the Bluetooth (BT) system of the present disclosure.

FIG. 1 shows an embodiment of the BT earphone system of the present disclosure. As shown in FIG. 1, the BT earphone system 100 includes a pair of BT earphones 120 and an earphone case 110 for storing and charging the pair of BT earphones 120. Each of the earphone case 110 and the pair of BT earphones 120 can be implemented independently. The earphone case 110 includes an earphone container 112 and a multifunction circuit 114, wherein most of the multifunction circuit 114 is set inside the earphone case 110 and thus the multifunction circuit 114 is represented with dotted box in FIG. 1. The earphone container 112 is configured to accommodate the pair of BT earphones 120, and to physically connect with multiple earphone terminals (not shown) of the pair of BT earphones 120 through multiple case terminals (not shown) of the earphone case 110. For example, the multiple case terminals include at least one signal terminal and a plurality of charging terminals; the at least one signal terminal is for the signal transmission between the earphone case 110 and the pair of BT earphones 120, and the number and specification of the at least one signal terminal comply with a transmission protocol (e.g., a Universal Asynchronous Receiver/Transmitter (UART) protocol; an Inter-Integrated Circuit ($I^2C$) protocol; and a Serial Peripheral Interface (SPI) protocol); the plurality of charging terminals is for charging the pair of BT earphones 120, and the design of the plurality of charging terminals is compatible with the design of the multiple case terminals. An embodiment of the multifunction circuit 114 is illustrated with FIG. 2, including: a rechargeable battery 210, a charging circuit 220, a BT circuit 230, a microphone circuit 240, an audio circuit 250, a user interface circuit 260, a control circuit 270, and the aforementioned at least one signal terminal 280, wherein some of the above-mentioned circuits (e.g., the microphone circuit 240, the user interface circuit 260, and the at least one signal terminal 280) may have a part exposed to the outside according to the demand for implementation. The detail of the multifunction circuit 114 is described in the following paragraphs.

Figure 2:
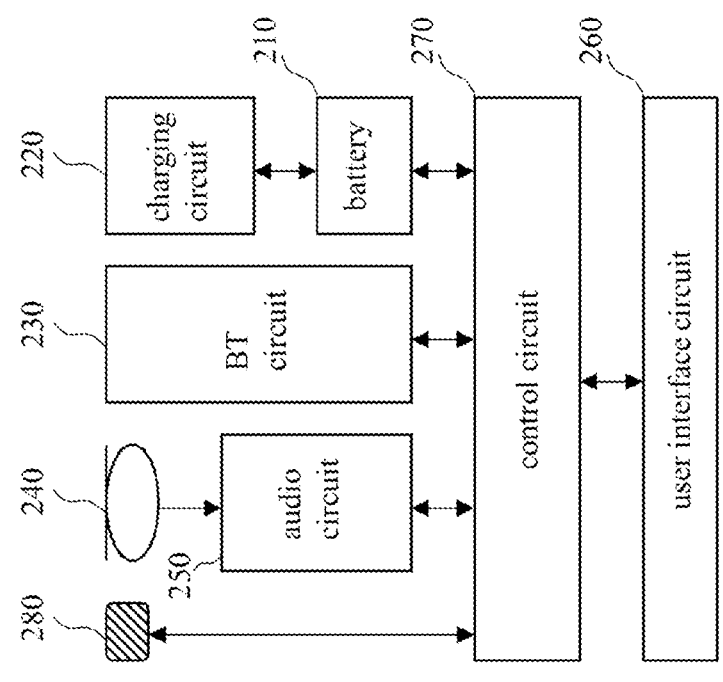
FIG. 2 shows an embodiment of the multifunction circuit of FIG. 1.

Please refer to FIGS. 1-2. The charging circuit 220 is configured to charge the pair of BT earphones 120 with the power of the rechargeable battery 210 when the earphone container 112 accommodates the pair of BT earphones 120. The BT circuit 230 is configured to be paired with the pair of BT earphones 120 when the earphone container 1120 accommodates the pair of BT earphones 120, and to communicate with the pair of BT earphones 120 through BT communication after the pair of BT earphones 120 is taken out from the earphone container 112; for example, the BT circuit 230 tries to communicate with the pair of BT earphones 120 through BT communication right after the pair of BT earphones 120 is taken out from the earphone container 112. The microphone circuit 240 is configured to receive outside sound (i.e., the sound in the environment where the earphone case 110 is placed) and thereby generate a microphone signal after the pair of BT earphones 120 is taken out from the earphone container 112; it should be noted that the microphone circuit 240 can be enabled automatically after the pair of BT earphones 120 is taken out, or be enabled in response to a user using the user interface circuit 260. The audio circuit 250 is configured to generate an audio signal according to the microphone signal and then provide the audio signal for the pair of BT earphones 120 through the BT circuit 230 in a predetermined mode (e.g., a listening mode described in a later paragraph). According to the demand for implementation, the audio circuit 250 can optionally include a known/self-developed stand-alone translation function; when the translation function is enabled due to a predefined trigger or user control, the audio signal is/includes translated audio signal.

Please refer to FIGS. 1-2. After the pair of BT earphones 120 is taken out from the earphone container 112, the user interface circuit 260 is configured to provide a user control signal for an internal circuit (e.g., the microphone circuit 240, the audio circuit 250, and the control circuit 270) in response to user control and thereby enable/control the internal circuit, or the user interface circuit 260 is configured to provide the user control signal for the pair of BT earphones 120 through the BT circuit 230. For example, the user control signal is an enablement signal or a mode control signal for the internal circuit, or it is a signal for the pair of BT earphones 120 to control music play or play effect. When the pair of BT earphones 120 receives the user control signal, it can perform an operation (e.g., transmitting a control signal for another BT device such as a music player or a smart phone) according to the user control signal, and this can be realized with known/self-developed techniques which fall without the scope of the present invention. In an exemplary implementation, the user interface circuit 260 includes at least one of the following (not shown): a physical button; a touch pad; a touch panel; and a motion detector.

Please refer to FIGS. 1-2. The control circuit 270 is configured to control interaction between the earphone case 110 and the pair of BT earphones 120; for example, the interaction involves a pairing operation, a BT communication operation, and an operation to process/forward a user command It should be noted that the pair of BT earphones 120 includes the aforementioned multiple earphone terminals. When the earphone container 112 accommodates the pair of BT earphones 120, the pair of BT earphones 120 communicates with the earphone case 110 through the multiple earphone terminals and the aforementioned multiple case terminals while the communication therebetween complies with a transmission protocol such as a UART/$I^2C$/SPI protocol. After the pair of BT earphones 120 is taken out from the earphone container 112, the pair of BT earphones 120 communicates with the earphone case 110 through BT communication instead. It should be noted that each of the rechargeable battery 210, charging circuit 220, BT circuit 230, microphone circuit 240, audio circuit 250, and user interface circuit 260 can be a known/self-developed circuit; in addition, those having ordinary skill in the art can implement the control circuit 270 with known/self-developed techniques according to the present disclosure.

Figure 3:
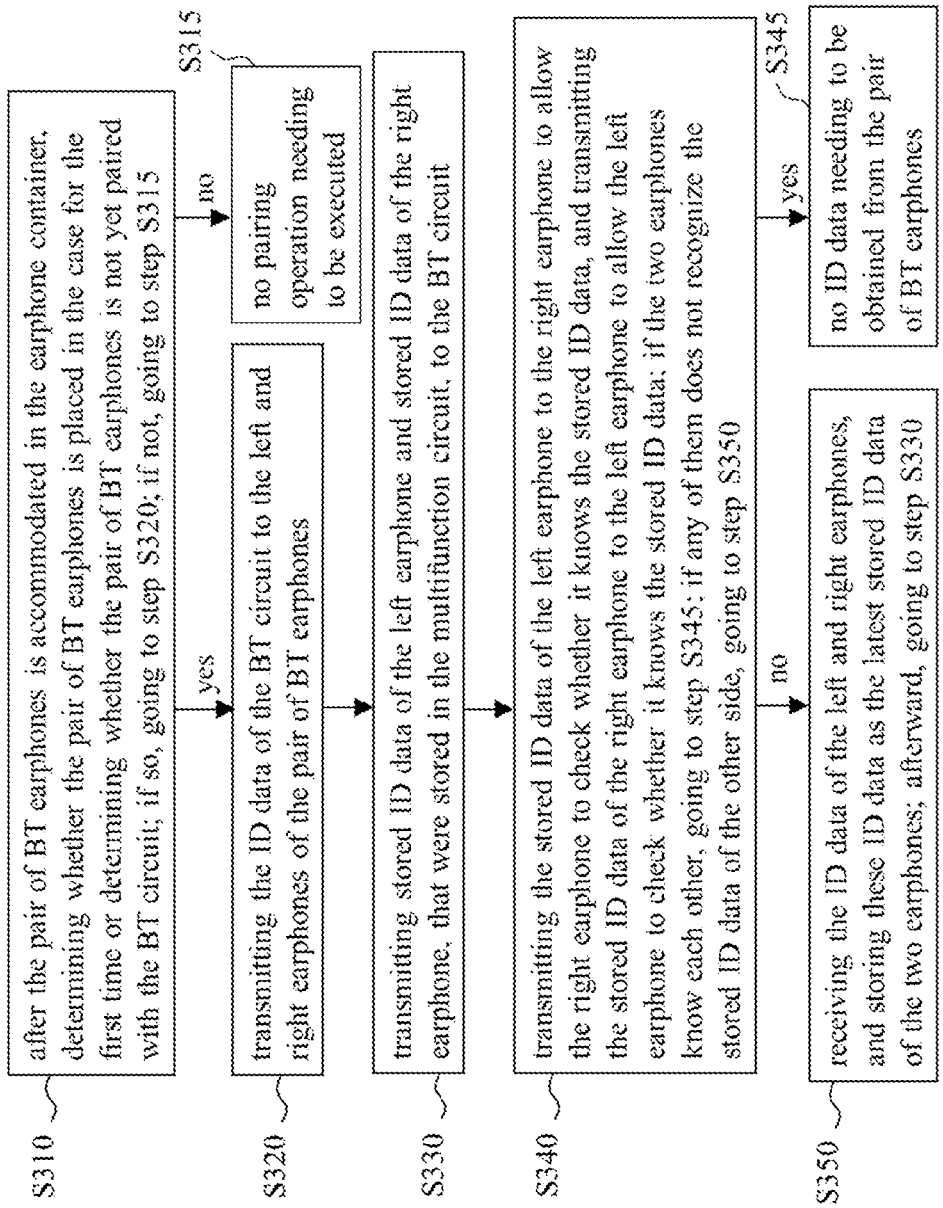
FIG. 3 shows an embodiment of the multiple steps executed by the control circuit of FIG. 2 for pairing.

Please refer to FIGS. 1-2. A first example of the aforementioned pairing operation includes: a first pairing operation between the BT circuit 230 and the pair of BT earphones 120; and a second pairing operation between a left earphone and a right earphone of the pair of BT earphones 120. A second example of the pairing operation includes the first pairing operation, but does not include the second pairing operation; in this case, the second pairing operation between the left earphone and the right earphone is executed by the pair of BT earphones 120 without the intervention of the earphone case 110. In order to fulfill the first example, the control circuit 270 executes multiple steps including the steps of FIG. 3 as follows: step S310: after the pair of BT earphones 120 is accommodated in the earphone container 112, determining whether the pair of BT earphones 120 is placed in the earphone case 110 for the first time or determining whether the pair of BT earphones 120 is not yet paired with the BT circuit 230; if so, going to step S320; if not, going to step S315.

step S315: no pairing operation needing to be executed. step S320: transmitting the identification (ID) data (e.g., media access control (MAC) address) of the BT circuit 230 to the left and right earphones of the pair of BT earphones 120 through the multiple case terminals step S330: transmitting stored ID data (e.g., MAC address) of the left earphone and stored ID data (e.g., MAC address) of the right earphone, that were stored in the multifunction circuit 114 (e.g., stored in the control circuit 270) before the pair of BT earphones 120 is placed in the earphone container 112 this time, to the BT circuit 230. In some circumstance, the left earphone and/or the right earphone may be replaced, and the stored ID data could be or could be not the ID data of the pair of BT earphones 120.

step S340: transmitting the stored ID data of the left earphone or the information thereof (e.g., specific code) to the right earphone through the multiple case terminals to allow the right earphone to check whether it knows the stored ID data of the left earphone, and transmitting the stored ID data of the right earphone or the information thereof (e.g., specific code) to the left earphone through the multiple case terminals to allow the left earphone to check whether it knows the stored ID data of the right earphone; if the left earphone and the right earphone know each other, going to step S345; if any of the left earphone and the right earphone does not recognize the stored ID data of the other side, going to step S350.

step S345: no ID data needing to be obtained from the pair of BT earphones.

step S350: receiving the ID data (e.g., MAC address) of the left earphone and the ID data (e.g., MAC address) of the right earphone through the multiple case terminals, and storing these ID data as the latest stored ID data of the two earphones; afterward, going to step S330.

It should be noted that both the paring operation between the BT circuit 230 and the pair of BT earphones and the paring operation between the left earphone and the right earphone are known/self-developed operations, and their detail is omitted here. It should also be noted that some step(s) of FIG. 3 may be omitted, if practicable.

Figure 4:
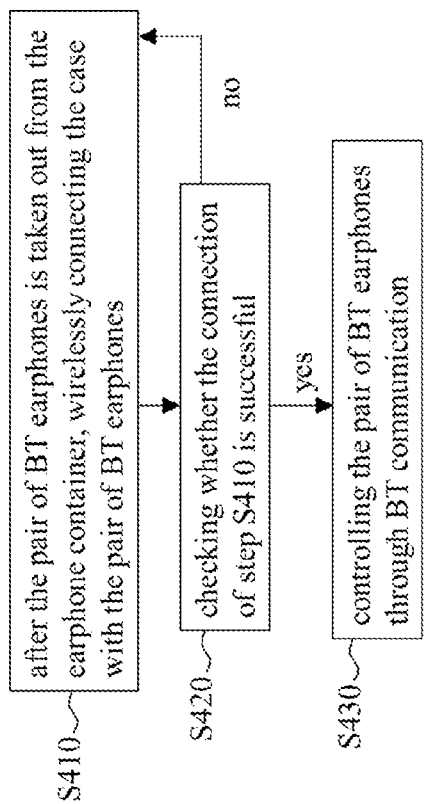
FIG. 4 shows an embodiment of the multiple steps executed by the control circuit of FIG. 2 for controlling the pair of BT earphones.

Please refer to FIGS. 1-2. An example of the aforementioned BT communication operation includes establishing a BT link between the BT circuit 230 and the pair of BT earphones 120 and establishing a BT link between the left earphone and the right earphone of the pair of BT earphones 120. In order to realize this example, the control circuit 270 performs multiple steps including the steps of FIG. 4 as follows:

step S410: after the pair of BT earphones 120 is taken out from the earphone container 112, wirelessly connecting the earphone case 110 with the pair of BT earphones 120.

step S420: checking whether the connection of step S410 is successful; if so, going to step S430; and if not, returning to step S410.

step S430: controlling the pair of BT earphones 120 through BT communication. It should be noted that the left earphone and the right earphone of the pair of BT earphones 120 can connect with each other, and the pair of the BT earphones 120 can further connect with another BT device (e.g., smart phone; notebook computer; tablet computer; or multimedia player); since the operations to realize the above-mentioned connections are known/self-developed techniques and fall without the scope of the present invention, their detail is omitted here. It should also be noted that the pair of BT earphones 120 may use a known/self-developed time division multiplexing (TDM) technique to connect with several devices wirelessly; for example, the pair of BT earphones 120 may connect with the BT circuit 230 and other BT devices (e.g., smart phone) by turns.

It should be noted that the operations for the BT connection between the BT circuit 230 and the pair of BT earphones 120 and the BT connection between the left earphone and the right earphone of the pair of BT earphones 120 are known/self-developed operations, and their detail is omitted here.

Please refer to FIGS. 1-2. The BT earphone system 100 of the present disclosure is applicable to multiple scenarios. In a classroom scenario, after the pair of BT earphones 120 is taken out from the earphone container 112, a user can use the user interface circuit 260 to have the earphone case 110 enter the aforementioned predetermined mode (e.g., listening mode) and then put the earphone case 110 in the front of a classroom; afterwards, the user can sit in the back of the classroom and wear the pair of BT earphones 120; accordingly, when a teacher lectures in the front of the classroom, the microphone circuit 240 can receive the teacher's voice and generate a microphone signal, the audio circuit 250 can generate an audio signal according to the microphone signal and then provide the audio signal for the pair of BT earphones 120 through the BT circuit 230. In a guide scenario, a tour guide can carry the earphone case 110 to give an explanation while each tourist in the vicinity of the tour guide can wear the pair of the BT earphones 120 to listen to the tour guide; it should be noted that the earphone case 110 can be paired with multiple pairs of BT earphones and can broadcast signals to these pairs of BT earphones. In a nursing scenario, the earphone case 110 can be set aside a person with disabilities while the care giver can wear the pair of BT earphones 120 and stay in another room; when the person needs anything, she/he can call the care giver by the earphone case 110, and the care giver can receive the calling by the pair of BT earphones 120 and respond immediately.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the BT earphone system of the present disclosure can not only control the pair of BT earphones with the earphone case, but also receive outside sound with the earphone case to provide audio signals for the pair of BT earphones. The earphone case and the pair of BT earphones can be implemented separately.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A Bluetooth (BT) earphone system, comprising:
a pair of BT earphones; and
an earphone case for storing and charging the pair of BT earphones, the earphone case comprising:
an earphone container for accommodating the pair of BT earphones, the earphone container including multiple case terminals configured to be coupled to multiple earphone terminals of the pair of BT earphones;
a rechargeable battery;

a charging circuit configured to charge the pair of BT earphones with power of the rechargeable battery when the earphone container accommodates the pair of BT earphones;

a BT circuit configured to be paired with the pair of BT earphones when the earphone container accommodates the pair of BT earphones, and further configured to communicate with the pair of BT earphones through BT communication after the pair of BT earphones is taken out from the earphone container;

a microphone circuit configured to receive outside sound and thereby generate a microphone signal after the pair of BT earphones is taken out from the earphone container;

an audio circuit configured to generate an audio signal according to the microphone signal and then provide the audio signal for the pair of BT earphones through the BT circuit in a predetermined mode;

a user interface circuit configured to provide a user control signal for the pair of BT earphones through the BT circuit in response to user control; and a control circuit configured to control interaction between the earphone case and the pair of BT earphones, wherein the pair of BT earphones is configured to communicate with the earphone case through the multiple earphone terminals when the earphone container accommodates the pair of BT earphones, and to communicate with the earphone case through the BT communication after the pair of BT earphones is taken out from the earphone container.

2. The BT earphone system of claim 1, wherein the user interface circuit includes one of following: a physical button; a touch pad; a touch panel; and a motion detector.

3. The BT earphone system of claim 1, wherein when the pair of BT earphones is placed in the earphone container, the control circuit executes multiple steps including:

determining whether the BT circuit is paired with the pair of BT earphones; and if the BT circuit is not paired with the pair of BT earphones, requesting the BT circuit to be paired with the pair of BT earphones.

4. The BT earphone system of claim 3, wherein the step of requesting the BT circuit to be paired with the pair of BT earphones includes:

transmitting identification (ID) data of the BT circuit to the pair of BT earphones through the multiple case terminals; and receiving ID data of the pair of BT earphones through the multiple case terminals, and then providing the ID data of the pair of BT earphones for the BT circuit.

5. The BT earphone system of claim 4, wherein the ID data of the BT circuit is a media access control (MAC) address of the BT circuit, and the ID data of the pair of BT earphones is a MAC address of the pair of BT earphones.

6. The BT earphone system of claim 4, wherein the pair of BT earphones includes a left earphone and a right earphone; the ID data of the pair of BT earphones include ID data of the left earphone and ID data of the right earphone; and the multiple steps further include:

before receiving the ID data of the pair of BT earphones, transmitting stored ID data of the left earphone or information thereof to the right earphone to allow the right earphone to check whether the right earphone knows the stored ID data of the left earphone, and transmitting stored ID data of the right earphone or information thereof to the left earphone to allow the left earphone to check whether the left earphone knows the stored ID data of the right earphone.

7. The BT earphone system of claim 3, wherein after the pair of BT earphone is taken out from the earphone container, the BT circuit wirelessly connects with the pair of BT earphones to have the pair of BT earphones be controlled by the earphone case.

8. The BT earphone system of claim 3, wherein after the pair of BT earphone is taken out from the earphone container, the pair of BT earphone wirelessly connects with the BT circuit and further with another BT device.

9. The BT earphone system of claim 8, wherein the pair of BT earphones communicates with the BT circuit and the another BT device in a manner of time-division multiplexing.

10. The BT earphone system of claim 1, wherein when the earphone container accommodates the pair of BT earphones, the pair of BT earphones communicates with the earphone case in compliance with one of following protocols: a Universal Asynchronous Receiver/Transmitter (UART) protocol; an Inter-Integrated Circuit ($I^2C$) protocol; and a Serial Peripheral Interface (SPI) protocol.

11. An earphone case for storing and charging a pair of BT earphones, the earphone case comprising:

an earphone container for accommodating the pair of BT earphones, the earphone container including multiple case terminals configured to be coupled to the pair of BT earphones;

a rechargeable battery;

a charging circuit configured to charge the pair of BT earphones with power of the rechargeable battery when the earphone container accommodates the pair of BT earphones;

a BT circuit configured to be paired with the pair of BT earphones when the earphone container accommodates the pair of BT earphones, and further configured to communicate with the pair of BT earphones through BT communication after the pair of BT earphones is taken out from the earphone container;

a microphone circuit configured to receive outside sound and thereby generate a microphone signal after the pair of BT earphones is taken out from the earphone container;

an audio circuit configured to generate an audio signal according to the microphone signal and then provide the audio signal for the pair of BT earphones through the BT circuit in a predetermined mode;

a user interface circuit configured to provide a user control signal for the pair of BT earphones through the BT circuit in response to user control after the pair of BT earphones is taken out from the earphone container; and a control circuit configured to control interaction between the earphone case and the pair of BT earphones.

12. The earphone case of claim 11, wherein the user interface circuit includes one of following:

a physical button; a touch pad; a touch panel; and a motion detector.

13. The earphone case of claim 11, wherein when the pair of BT earphones is placed in the earphone container, the control circuit executes multiple steps including:

determining whether the BT circuit is paired with the pair of BT earphones; and if the BT circuit is not paired with the pair of BT earphones, requesting the BT circuit to be paired with the pair of BT earphones.

14. The earphone case of claim 13, the step of requesting the BT circuit to be paired with the pair of BT earphones includes:
   transmitting identification (ID) data of the BT circuit to the pair of BT earphones through the multiple case terminals; and
   receiving ID data of the pair of BT earphones through the multiple case terminals, and then providing the ID data of the pair of BT earphones for the BT circuit.

15. The earphone case of claim 14, wherein the ID data of the BT circuit is a media access control (MAC) address of the BT circuit, and the ID data of the pair of BT earphones is a MAC address of the pair of BT earphones.

16. The earphone case of claim 14, wherein the pair of BT earphones includes a left earphone and a right earphone; the ID data of the pair of BT earphones include ID data of the left earphone and ID data of the right earphone; and the multiple steps further include:
   before receiving the ID data of the pair of BT earphones, transmitting stored ID data of the left earphone or information thereof to the right earphone to allow the right earphone to check whether the right earphone knows the stored ID data of the left earphone, and transmitting stored ID data of the right earphone or information thereof to the left earphone to allow the left earphone to check whether the left earphone knows the stored ID data of the right earphone.

17. The earphone case of claim 13, wherein after the pair of BT earphone is taken out from the earphone container, the BT circuit wirelessly connects with the pair of BT earphones to have the pair of BT earphones be controlled by the earphone case.

18. The earphone case of claim 11, wherein the earphone case is configured to communicate with the pair of BT earphones through the multiple case terminals when the earphone container accommodates the pair of BT earphones.

19. The earphone case of claim 18, wherein when the earphone container accommodates the pair of BT earphones, the earphone case communicates with the pair of BT earphones in compliance with one of following protocols: a Universal Asynchronous Receiver/Transmitter (UART) protocol; an Inter-Integrated Circuit (I²C) protocol; and a Serial Peripheral Interface (SPI) protocol.

* * * * *